(12) United States Patent
Carlisle et al.

(10) Patent No.: US 6,196,731 B1
(45) Date of Patent: Mar. 6, 2001

(54) QUICK-CONNECT FIBER OPTIC CONNECTOR

(75) Inventors: Arthur W. Carlisle, Dunwoody; Jeffrey H. Hicks, Lilburn; Norman R. Lampert, Norcross, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/183,063

(22) Filed: Oct. 30, 1998

(51) Int. Cl.[7] .................................................. G02B 6/36
(52) U.S. Cl. .............................. 385/76; 385/77; 385/78; 385/60; 385/81
(58) Field of Search ................................ 385/76, 77, 78, 385/81, 72, 60

(56) References Cited

U.S. PATENT DOCUMENTS

| | | | |
|---|---|---|---|
| 4,634,214 | 1/1987 | Cannon, Jr. et al. | 358/96.2 |
| 5,481,634 * | 1/1996 | Anderson et al. | 385/76 |
| 5,647,043 * | 7/1997 | Anderson et al. | 385/76 |
| 5,923,805 * | 7/1999 | Anderson et al. | 385/77 |
| 6,017,153 * | 1/2000 | Carlisle et al. | 385/78 |
| 6,019,520 * | 2/2000 | Lin et al. | 385/76 |
| 6,019,521 * | 2/2000 | Manning et al. | 385/77 |
| 6,024,498 * | 2/2000 | Carlisle et al. | 385/76 |

* cited by examiner

*Primary Examiner*—Frank G. Font
*Assistant Examiner*—Roy M. Punnoose

(57) ABSTRACT

An optical connector includes a slug made from a malleable material and positioned behind a ferrule within a barrel member. The slug includes a capillary hole along its longitudinal axis for accommodating an optical fiber. One or more pins extend outwardly from the barrel and are generally orthogonal to the longitudinal axis. The pins provide several functions in the optical connector, including securing the slug within the barrel member, securing the optical fiber within the slug, and securing the barrel to a connector housing that includes a latch.

12 Claims, 5 Drawing Sheets

QUICK-CONNECT FIBER OPTIC CONNECTOR

BACKGROUND OF THE INVENTION

The present invention relates generally to a connector for an optical fiber cable, and, more particularly, to an optical connector that can be readily installed in the field without the need for epoxy or anaerobic adhesives.

Optical fiber connectors and splices are an essential part of optical fiber communications systems. Connectors may be used to join lengths of optical fiber into longer lengths, or to connect optical fiber to active devices such as radiation sources, detectors, repeaters, or to passive devices such as switches or attenuators.

Many prior art connectors use adhesives or epoxies in securing connector components. For example, a typical connector includes a ferrule piece rigidly attached to a connector body. Adhesive is injected into a longitudinal bore of the ferrule. A cable is received into the connector body with the enclosed fiber projecting along the longitudinal bore of the ferrule. The adhesive wicks and adheres to the fiber, the ferrule, the connector body, and other connector parts to permanently secure the connector components to one another.

There is a growing demand, however, for a fiber optic connector that is simple to install or assemble in a field setting. In particular, there is a growing resistance to the use of epoxies that require special heat-curing ovens to facilitate solidification, and, in general, to the use of chemicals such as anaerobic adhesives.

Accordingly, what is sought, and what is not believed to be provided by the prior art, is a fiber optic connector that can be easily installed or assembled without the use of epoxies or adhesives.

SUMMARY OF THE INVENTION

Certain advantages and novel features of the invention will be set forth in the description that follows and will become apparent to those skilled in the art upon examination of the following or may be learned with the practice of the invention.

To achieve the advantages and novel features, the present invention is generally directed to a fiber optic connector that can be installed in the field without the use of any adhesive or epoxy. The connector includes a housing that contains a barrel member. The barrel member has a ferrule disposed at one end, which terminates the optical fiber, and a barrel extension at the other end for receiving a buffered fiber. A slug made from a malleable material is confined within the barrel member. Both the barrel and the housing include an aperture, which are in substantial alignment with one another. A pin is disposed in the housing aperture that has a length such that when the pin is pressed to be substantially flush with the housing, the pin engages the slug contained within the barrel member.

The invention can also be viewed as providing a method for installing a fiber optic connector without using adhesives. In this regard, the method can be broadly summarized by the following steps: A slug of malleable material is inserted into a barrel member having an aperture formed therein. A pin is inserted into the aperture formed in the barrel member. The barrel member is surrounded with a housing that has an aperture formed therein that allows the pin to extend threrethrough. Finally, the pin is compressed until the pin engages the slug held within the barrel member, thereby causing the slug to grip the optical fiber running through the barrel member.

Advantageously, a technician can secure an optical fiber to the slug, the slug to the barrel, and the barrel to the connector housing by using a simple tool designed to compress the pin until it is substantially flush with the housing. Thus, the connector can be installed or assembled without the use of any adhesive or epoxy, which is particularly useful in a field setting.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENT

Figure 1:
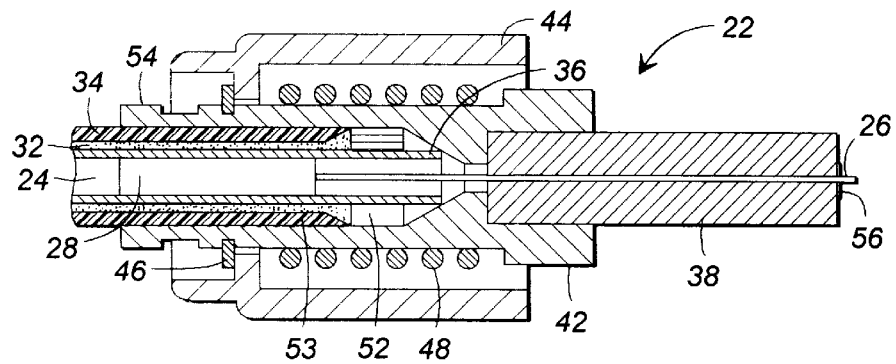
FIG. 1 is a cross sectional view of a prior art, optical fiber connector incorporating a ferrule member.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

With reference to FIG. 1, a portion of a prior art fiber optic connector 22 is shown to terminate a fiber optic cable 24. The cable 24 comprises optical fiber 26, which is surrounded by a thermoplastic buffer 28 providing protection and forming what is commonly referred to as a "buffered fiber." The outside diameter of buffer 28 is typically 900 μm, which is a common standard for many connectors and splicing tools. Cable 24 is generally completed with a layer of aramid strength material 32 and an outer jacket of polyvinyl chloride (PVC) 34. The aramid strength material typically comprises a KEVLAR® yarn, which provides crush resistance and withstands the tensile stresses applied to the cable. Outer jacket 34 is designed to protect against environmental hazards such as abrasion, oil, solvents and other contaminates. In addition, the jacket 34 generally defines the cable's duty and flammability rating.

Optical fiber cables comprising jacketed fibers are well known in the art. The outer jacket 34 is removed from a length of optical fiber 26 and a sleeve 36, which is typically a stainless steel tube, is partially inserted between the buffer 28 and the fiber strength material 32 with part of the sleeve 36 extending beyond the outer jacket 34. Ferrule 38 is held rigidly in the connector body or barrel 42 by adhesive means or other suitable means (e.g., a press fit). Connector housing 44 is held in place by a retaining ring 46 and a spring 48. By partially filling the empty space 52 between the connector body 42 and the sleeve 36 with adhesive, a relatively strong bond will form in the region 53 between the outer jacket 34 and the connector body 42 once the adhesive cures. The adhesive, which is generally a themosetting epoxy, typically is transported along the strength material 32 by a wicking action, greatly increasing the bonding area between the sleeve 36 and the strength material 32.

Before insertion of the cable 24 into the connector body 42, an adhesive, typically also a thermosetting epoxy, is injected into the bore of the ferrule 38, followed by threading the fiber 26 through the bore until the cable 24 is positioned substantially as shown in FIG. 1. Lightly crimping the connector body 42 in the region indicated by numeral 54 preliminarily secures the cable 24 in the connector body 42 and prevents wicking of the adhesive past the crimping region. Once the adhesive cures, the fiber 26 protruding from the end 56 of ferrule 38 is severed using any appropriate means (e.g., scribing and breaking) and the fiber end is polished using standard polishing procedures that are well known in the art.

As discussed hereinbefore, the use of adhesives or epoxies in installing fiber optic connectors is inconvenient when performing field installations. Moreover, the use of epoxies and chemical adhesives is falling into disfavor because of the associated need for curing ovens and for environmental reasons.

Figure 2:
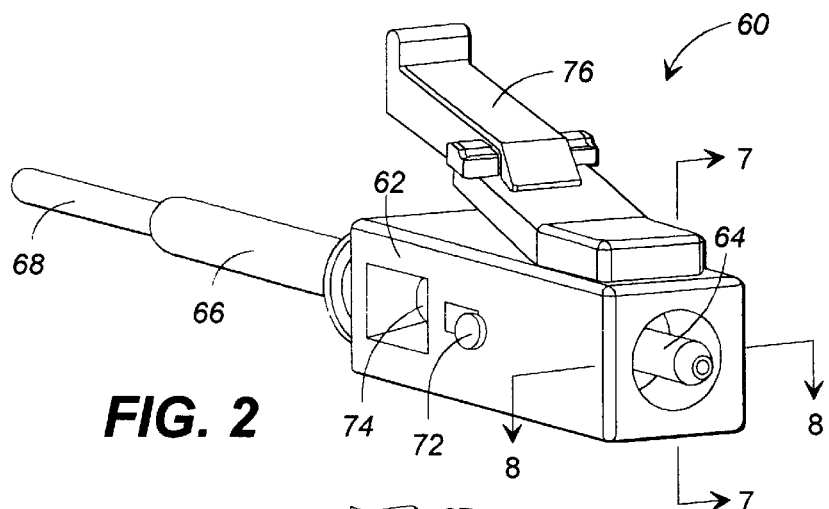
FIG. 2 is a perspective view of a quick-connect optical connector in accordance with the principles of the present invention.

A quick-connect fiber optic connector 60 that can be easily installed in a field setting without using epoxies or adhesives is shown in FIG. 2. The fiber optic connector 60 according to the present invention is embodied in an LC type connector. It should be appreciated that the principles of the invention disclosed herein can be applied to other known optical connectors, such as ST, SC, and FC varieties, and that the choice of an LC type connector for the preferred embodiment is for illustrative purposes only. The quick-connect connector 60 includes a housing 62 having a ferrule 64 extending out of one end of the housing 62 and a barrel extension 66 extending out of the other end. A buffered fiber 68 of the type described hereinabove with respect to FIG. 1 (i.e., buffer 28) is received in the barrel extension 66 with the optical fiber carried by the cable terminating in the ferrule 64. The quick-connect fiber optic connector 60 further includes a pair of metallic or hard plastic pins 72—72 (one shown) disposed in the sides of housing 62 and penetrating into the interior of connector 60. In addition, a pair of windows or apertures 74—74 (one shown) are also formed in the sides of housing 62 allowing access to a portion of the barrel extension 66 from the outside of connector 60. A latch 76 is included that facilitates mating of connector 60 with a complementary connector or receptacle.

Figure 3:
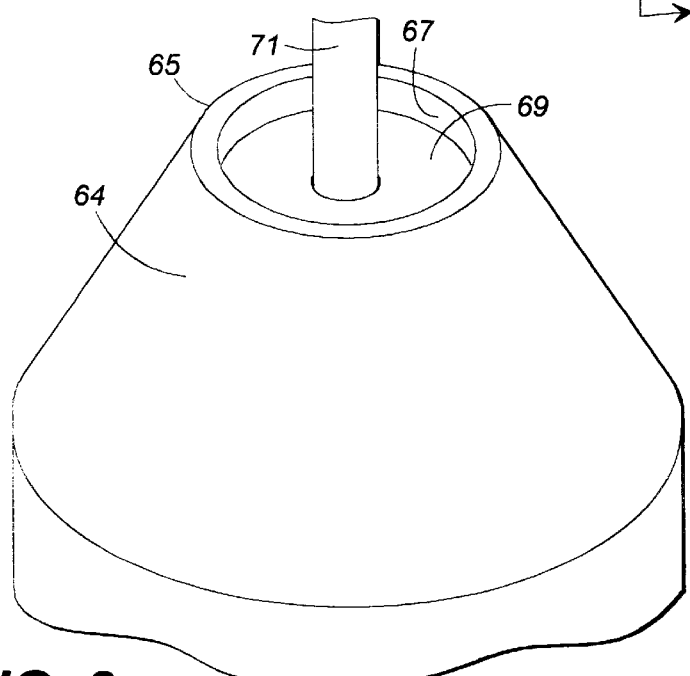
FIG. 3 is a perspective view of the quick-connect connector of FIG. 2 with the housing cut away to reveal the internal structure.
Figure 4:
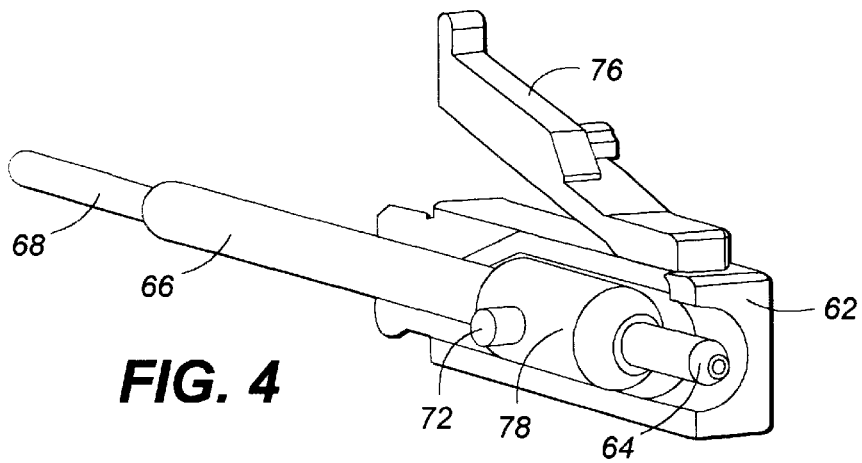
FIG. 4 is a perspective view of the internal barrel assembly shown in FIG. 3.

Turning now to FIG. 3, the internal structure of connector 60 is shown in relation to a cross section of housing 62. In particular, the housing 62 is shown to include a barrel member 78 that is configured to receive the pins 72 into openings in the barrel surface. FIG. 4 provides a perspective view of the entire barrel assembly comprising the barrel member 78, which supports the ferrule 64 for terminating the optical fiber at one end, and supports the barrel extension 66 for receiving the buffered fiber 68 at the other end. Typically, the barrel member 78, ferrule 64, and barrel extension 66 are insert molded in the housing 62. Pins 72—72 (one shown) are disposed in openings in the surface of barrel member 78.

Figure 5:
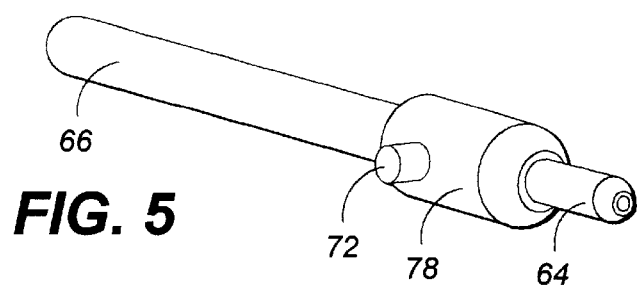
FIG. 5 is a cross sectional view of the barrel assembly of FIG. 4.
Figure 6:
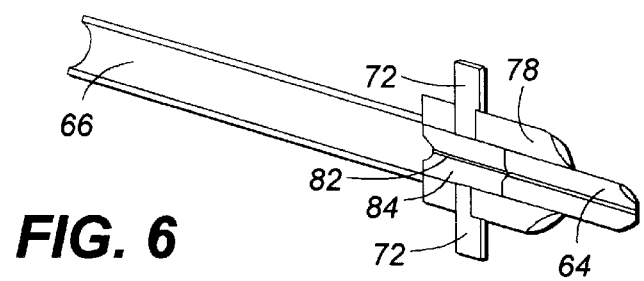
FIG. 6 is a cross sectional view of a cylindrical slug used in the barrel assembly of FIGS. 4 and 5.

A cross section of the barrel assembly is shown in FIG. 5. Most importantly, FIG. 5 shows a cylindrical slug 82 disposed within barrel 78 immediately behind ferrule 64. Slug 82 is preferably made from a malleable material, such as fully-annealed aluminum or plastic, and contains a capillary channel 84 for holding the optical fiber. The capillary channel 84 can be round, triangular, or diamond shaped. To provide more flexibility in conforming the shape of the capillary channel 84 to the optical fiber, the slug can be split into two interlocking pieces 82a and 82b as shown in FIG. 6. The pins 72—72 are in communication with slug 82 through the openings in barrel member 78.

Figure 7:
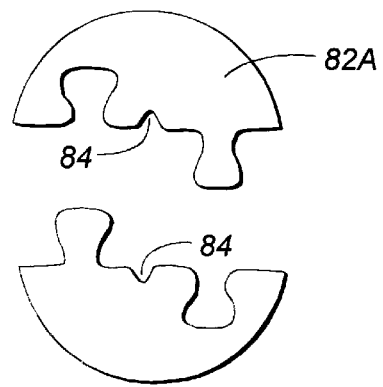
FIG. 7 is a cross sectional view of the quick-connect connector of FIG. 2 in which the connector is disposed in a receptacle.
Figure 8:
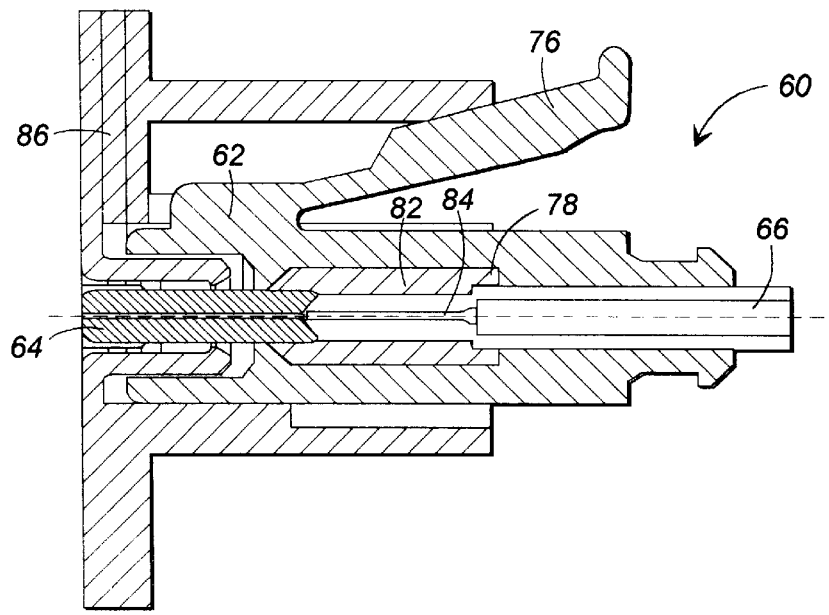
FIG. 8 is a second cross sectional view of the quick-connect connector of FIG. 2 in which the connector is disposed in a receptacle.

FIGS. 7 and 8 provide a more detailed illustration of the internal structure of connector 60. FIG. 7 is a cross sectional view of connector 60 taken along lines 7—7 of FIG. 2. In FIG. 7, the connector 60 is shown as received in a receptacle 86. Note that the end of slug 82 is beveled where the optical fiber is received from barrel extension 66 to facilitate entry of the fiber into channel 84. Likewise, the end of ferrule 64 is beveled at the junction with slug 82 to provide similar assistance in guiding the fiber into the channel opening.

FIG. 8 is a cross sectional view of connector 60 taken along lines 8—8 of FIG. 2.

Like FIG. 7, the connector 60 is shown as received in a receptacle 86. In addition to illustrating the foregoing features discussed with reference to FIG. 7, FIG. 8 also illustrates the windows 74—74 that provide access to the barrel extension 66 through the housing 62 of connector 60. Moreover, openings 88 are shown that extend through barrel 78 and align with the openings in housing 62 holding pins 72—72 to allow the pins 72—72 to engage the slug 82.

As will be described in more detail hereinafter, the unique operation of pins 72 and slug 82 allow connector 60 to be quickly, and easily installed in the field without the use of adhesives or epoxies. In the manufacturing process, slug 82 is inserted into the barrel 78 directly behind the ferrule 64. This is followed by pressing the barrel extension 66 into the barrel 78 to effectively hold the slug 82 in place. Pins 72—72 are press fitted into openings 88 in the barrel 78. The pins 72—72 abut slug 82 and are oriented orthogonally thereto. Generally, the pins 72—72 are pressed into the barrel member 78 during the manufacturing process and extend a prescribed distance outside of the barrel 78. The barrel 78, barrel extension 66, ferrule 64, slug 82, and openings 88 can be insert molded within the housing 62 to form a single integrated part.

The fiber optic cable is prepared by stripping away the outer layers including the outer jacket, the strength material, and the buffer until the fiber is revealed. The fiber is then inserted into the connector 60 through the barrel extension 66 and into the capillary channel 84 in the slug 82 until the buffer (see FIG. 1—buffer 28) contacts the slug 82. Enough fiber should be exposed to ensure that the fiber extends out of the end of ferrule 64 before the buffer contacts the slug 82.

Figure 9:
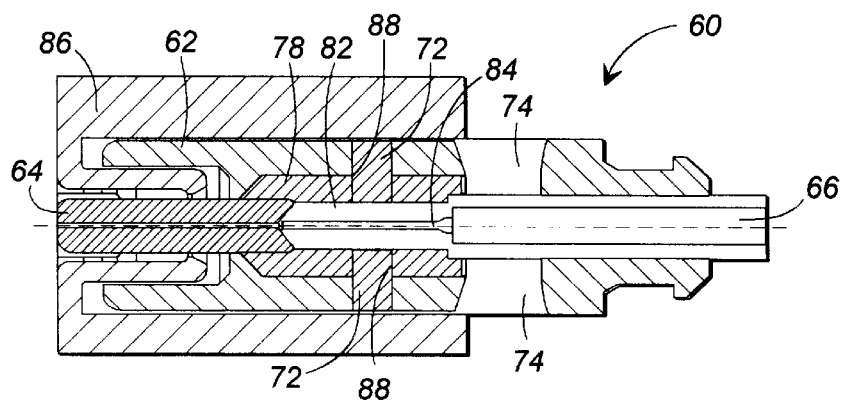
FIG. 9 is a perspective view of a tool used in installing the quick-connect connector of FIG. 1.
Figure 10:
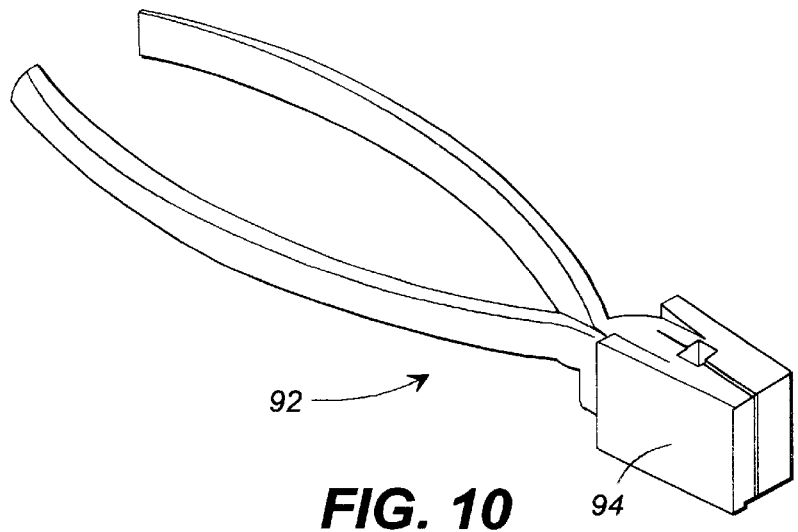
FIG. 10 is a perspective view of the quick-connect connector of FIG. 2 received in the tool of FIG. 9.

Once the fiber has been inserted through connector 60, a hand-held pliers like tool 92 shown in FIG. 9 is used to crimp the barrel extension 66 to the buffered fiber and to simultaneously press the pins 72—72 into the openings 88 in barrel 78. FIG. 10 depicts the connector 60 received in the tool head 94. Tool head 94 is dimensioned to conform to the geometry of the connector 60 such that when connector 60 is compressed between the two halves of tool head 94 the pins 72—72 are pressed substantially flush with the connector housing 62. The inward movement of the pins 72—72 causes the slug 82, which is made from a malleable material, to collapse around the fiber, thereby holding the fiber securely in place. The pins 72—72 are received in the openings 88 in the barrel 78 with a sufficiently tight fit to ensure that they do not loosen and relax the pressure upon slug 82. Tool head 94 also includes raised regions that penetrate windows 74—74 in connector housing 62 to crimp barrel extension 66 to the buffered fiber.

Thus, the pins 72—72 used in the connector 60 according to the present invention allow a technician to secure the fiber to the slug 82, the slug 82 to the barrel 78, and the barrel 78 to the connector housing 62 by using a simple tool 92 and without the use of any adhesive or epoxy. Moreover, as a result of the windows 74—74 formed in the connector housing 62, the buffered cable can be crimped to the barrel extension 66 coincidentally with the securing of the aforementioned internal connector 60 components.

Figure 11:
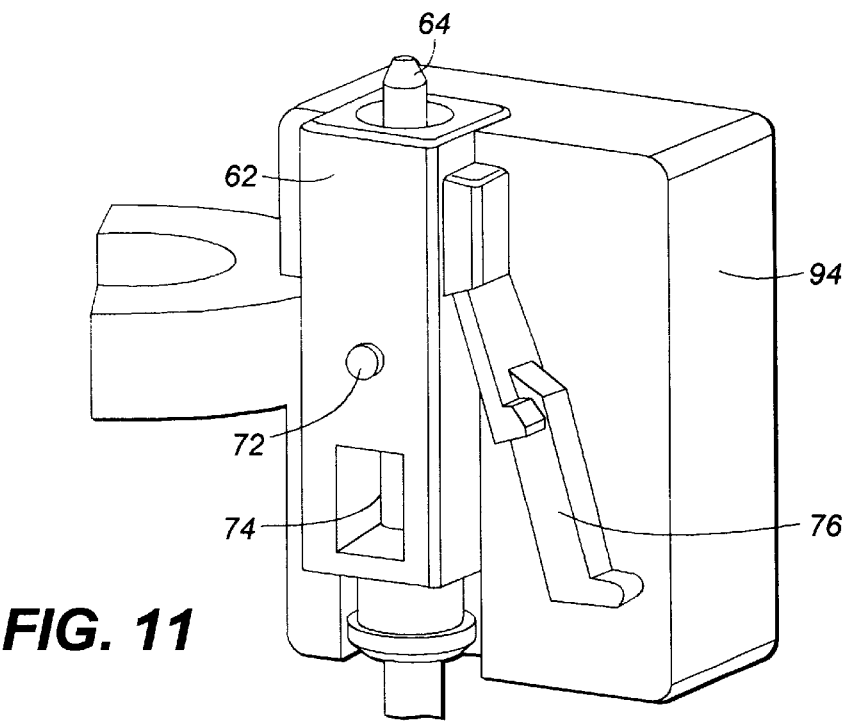
FIG. 11 is a perspective view of an alternative embodiment of the quick-connect connector according to the present invention in which the ferrule is biased by an internal spring.

The principles of the present invention can also be applied to connectors used with jumper cables that typically use an internal spring to provide an axial bias force for the ferrule and barrel components. FIG. 11 shows a quick-connect connector 160 in accordance with the present invention that can be used in jumper cable applications. Like connector 60, connector 160 includes a ferrule 164, a pair of pins 172—172, a pair of windows 174—174 that provide access to the barrel extension 166, and a latch 176. Unlike, connector 60, however, connector 160 includes a two part housing 162a,b and a pair of slots 173—173 that allow movement of the pins with respect to the housing 162a,b.

Figure 12:
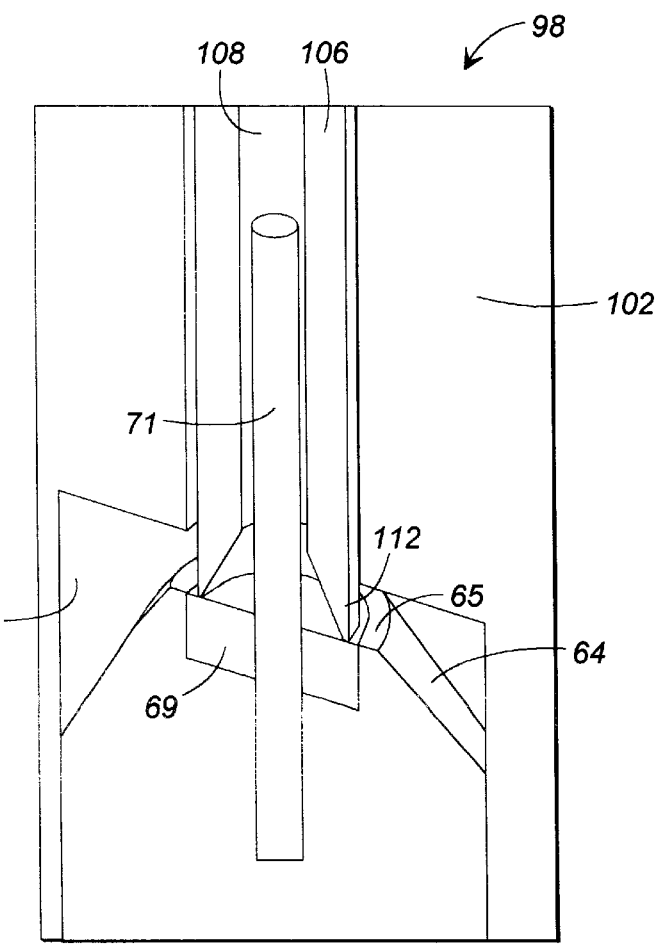
FIG. 12 is a cross sectional view of the quick connect connector of FIG. 11.

A cross sectional view of the internal structure of connector 160 is shown in FIG. 12. The basic structure is the same as that of connector 160 with the ferrule 164 being connected to the barrel member 178, which in turn is connected to the barrel extension 166. The slug 182 is positioned immediately behind the ferrule 164 as in connector 60. To provide for movement of the barrel-ferrule assembly, however, a spring 167 is disposed about the barrel extension 166 and is confined between the barrel member 178 and a shoulder of housing part 162b. The spring is designed to provide a specific axial load on the ferrule interface and also to compensate for overtravel of latch 176. Finally, housing part 162a, includes latching arms 163—163 that engage flanged regions in housing part 162b to secure the two housing parts 162a,b to one another.

Figure 13:
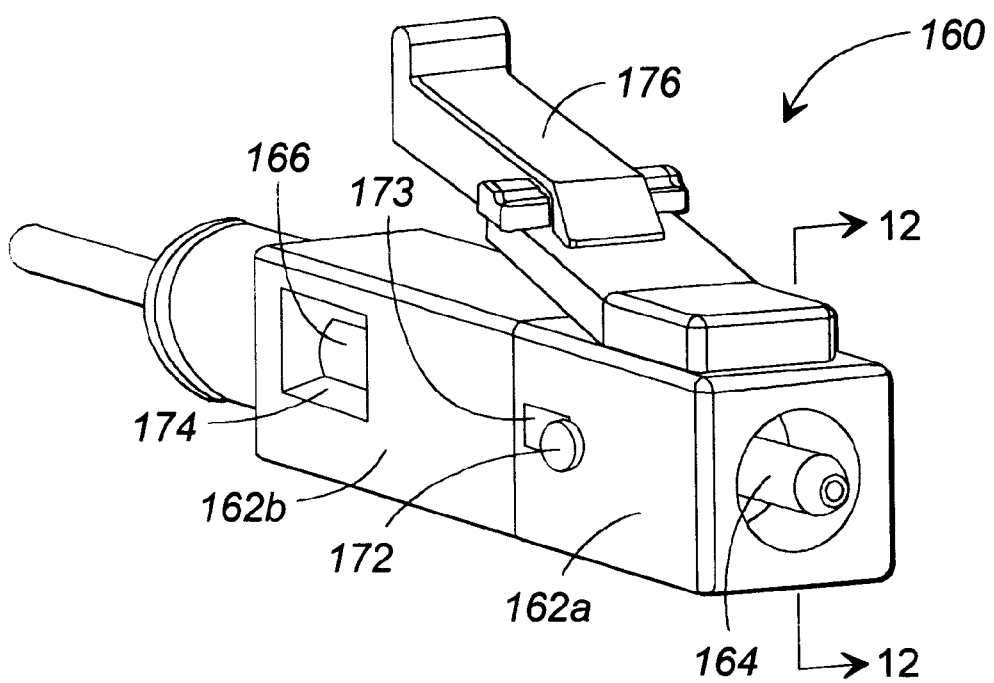
FIG. 13 is a perspective view of the quick-connect connector of FIG. 11 received in an installation tool.

The installation of connector 160 is substantially similar to the installation of connector 60, however, in a jumper cable the aramid strength members or material (see FIG. 1—strength material 32) are generally attached to the connector 160 structure. Thus, before inserting the buffered fiber into barrel extension 166, a crimp sleeve 196 as shown in FIG. 13 is slid upon the outer jacket of the cable. The buffered fiber is then seated in the slug 182 and the fiber is threaded through the ferrule 164 as discussed hereinbefore. Then, using a pliers-like tool similar to tool 92 in FIG. 9, but having a modified head 194 as shown in FIG. 13, the crimp sleeve 196 is crimped, thereby joining the outer jacket of cable 168 to the barrel extension 166.

Once the cable jacket is secured to the barrel extension 166, the remainder of the installation process is the same as that used for connector 60. Advantageously, the tool head 194 includes a second formed region 195 that is identical to the pattern formed in tool head 94 for pressing in pins 172—172 and for crimping the buffered fiber to the barrel extension 166.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

We claim:

1. A fiber optic connector, comprising:
    a housing having a first aperture formed therein;
    a barrel member contained in said housing, said barrel member having a ferrule disposed at a first end, a barrel extension disposed at a second end, and an aperture formed therein that is in substantial alignment with said first aperture in said housing;
    a slug of malleable material confined in said barrel member; and
    a pin extending through said first aperture in said housing and disposed in said aperture in said barrel member, said pin being oriented orthogonal to an axis defined by said slug and being of suitable length such that when said pin is substantially flush with said housing said pin engages said slug.

2. The connector of claim 1, wherein said housing further includes a second aperture formed therein such that said barrel extension is exposed.

3. The connector of claim 1, wherein said slug is made from fully-annealed aluminum.

4. The connector of claim 1, wherein said slug is made from plastic.

5. The connector of claim 1, wherein said slug is made from a pair of interlocking pieces.

6. The connector of claim 1, wherein said slug is beveled at a first end for receiving an optical fiber from said barrel extension.

7. The connector of claim 1, wherein said housing comprises first and second interlocking housing parts and further comprising a spring disposed about said barrel extension, said spring being confined between said barrel member and said first housing part.

8. The connector of claim 7, wherein said first aperture in said housing is a slot in said second housing part allowing said pin to move relative to said first and second housing parts upon operation of said spring.

9. A method for installing a fiber optic connector, comprising the steps of:
    inserting a slug of malleable material in a barrel member, said barrel member having a ferrule disposed at a first end, a barrel extension disposed at a second end, and an aperture formed therein;
    inserting a pin in said aperture in said barrel member;

surrounding said barrel member with a housing, said housing having a first aperture formed such that said pin extends therethrough; and compressing said pin until said pin engages said slug.

10. The method of claim 9, wherein said housing includes a second aperture formed therein such that said barrel extension is exposed and further comprising the step of:

crimping said barrel extension to a buffered fiber through said second aperture.

11. The method of claim 10, wherein said compressing and said crimping steps are performed simultaneously.

12. The method of claim 10, further comprising the steps of:

providing a crimp sleeve about an outer jacket of said buffered fiber; and crimping said crimp sleeve to said barrel extension.

* * * * *